Patented June 5, 1951

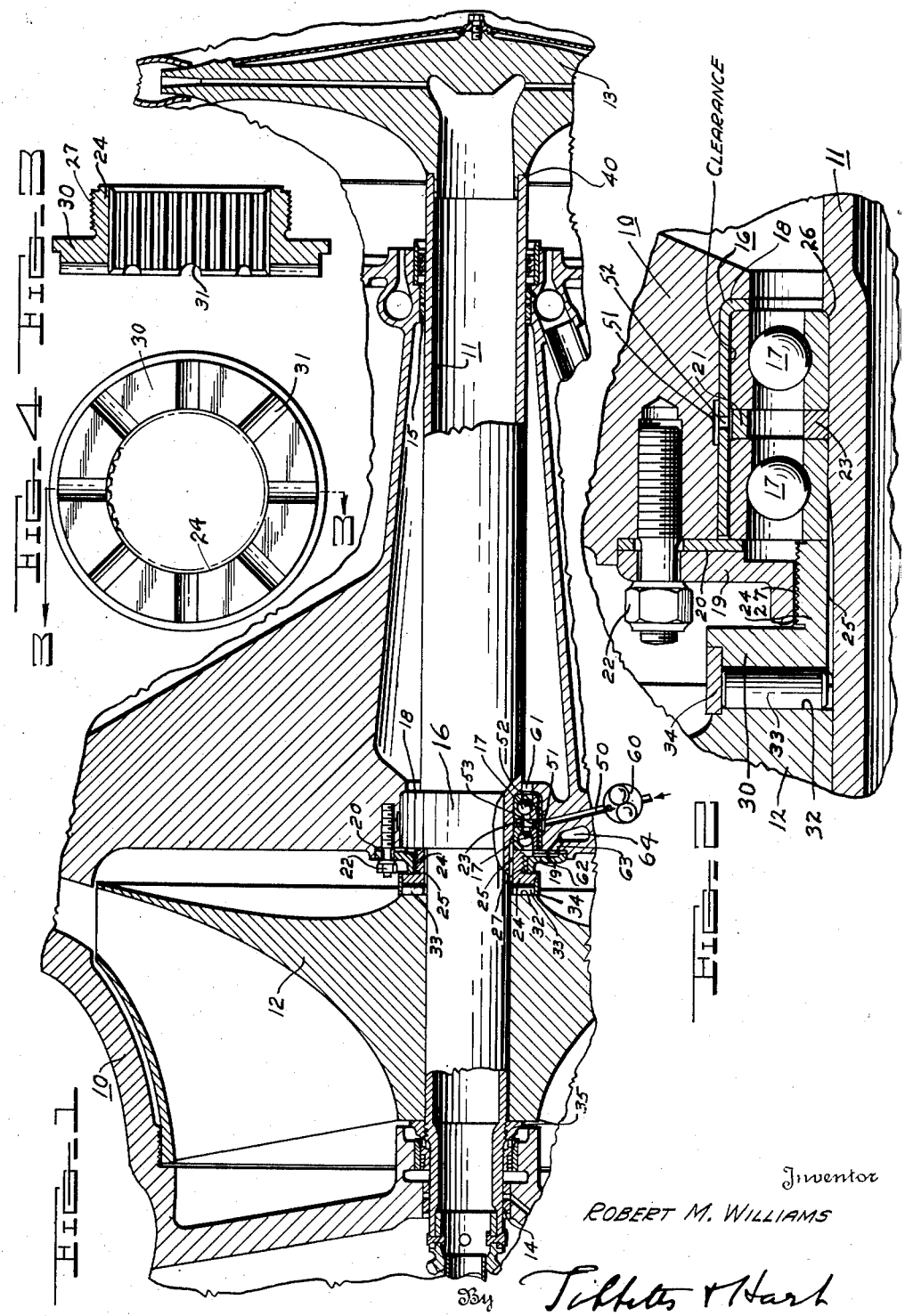

2,556,020

UNITED STATES PATENT OFFICE 2,556,020

TURBINE

Robert M. Williams, Toledo, Ohio, assignor to Packard Motor Car Company, Detroit, Mich., a corporation of Michigan Application March 23, 1946, Serial No. 656,626

6 Claims. (Cl. 230—116)

This invention relates to turbines and particularly to the mounting of the high speed shaft and its operating elements in a gas turbine.

The invention is shown in connection with that type of gas turbine in which a centrifugally operating impeller is mounted at one end of a shaft and a turbine wheel is mounted at the other end thereof. In such a turbine the shaft is driven at a very high speed and it is desirable that such shaft should be made small in diameter so that ball thrust bearings may be used, and as light as possible, and yet of sufficient strength to withstand the stresses to which it is subjected in operation. This means that in attaining the very high operating speed for which the turbine is designed it may pass through a critical speed which in some instances will cause the shaft to tend to move or vibrate radially which movement if not checked will possibly cause destruction of the shaft or bearings.

It is an object of the invention therefore to so mount the operating elements on the shaft and to so support the shaft in the turbine casing that the tendency to vibrate or move radially is resisted and damped or cushioned so that the mechanism may pass through the critical speed and reach the high operating speed for which it is designed.

With the above object in view, the invention provides a novel mounting of the compressor impeller on the shaft and a mounting of one of the shaft bearings so that any radial movement of the shaft in that bearing may be damped both by fluid and friction to thereby resist radial movement.

Other objects of the invention will appear from the following description taken in connection with the drawing, which forms a part of this specification, and in which:

Fig. 1 is a sectional view of a portion of a gas turbine embodying the invention;

Fig. 2 is an enlarged sectional view of the intermediate thrust bearing and associated parts and the mounting of the impeller on the shaft;

Fig. 3 is a sectional view of the sleeve which forms a part of the mounting of the impeller on the shaft; and Fig. 4 is a face view of the sleeve of Fig. 3.

Referring to the drawing, 10 represents generally the casing or support of the gas turbine and 11 is the main operating shaft upon which are mounted a compressor impeller 12 and a turbine wheel 13. These are the principal operating elements of the machine or turbine.

In the form shown, the shaft 11 is mounted in two widely separated plain bearings 14 and 15 and there is an intermediate thrust bearing 16. The latter is in the form of two ball bearings 17 which together are arranged to resist the end thrusts of the shaft 11 in both directions. The outer races of the bearings 17 are fitted into a sleeve or cup 18 which is fitted closely in the casing 10. But between the outer races of the bearings 17 and the cup 18 there is an appreciable radial clearance of say five-thousandths of an inch (.005″) or thereabouts. Thus the shaft may be said to be normally supported radially by the plain bearings 14 and 15 with clearance at the mounting of the thrust bearing 16 so that the latter will not normally support the shaft 11 radially at all. Bearing 16 however will resist end movements of the shaft and by reason of the clearance above referred to the bearing will perform another function as hereinafter described.

The ball bearings 17 are retained in the cup 18 by means of a cover 19 and a plate 20, these acting against the outer races of the bearings and through a separating ring 21 and being secured to the casing by a series of bolts 22. Clamping of the outer races of the bearings 17 is such that there can be movement of those races radially within the limits of the clearance above referred to but at the same time this movement is frictionally resisted for a purpose hereinafter described.

There is also a separating ring 23 between the inner races of the bearings 17, and bearing against one of those inner races is a sleeve 24 which is splined to the shaft 11 as indicated at 25. The inner race of the other bearing 17 rests against a shoulder 26 on the shaft 11.

The exterior of the hub portion of the sleeve 24 is threaded as at 27 and the inner portion of the plate 19 is closely associated with said threaded portion so that leakage of oil from the bearings is prevented or reduced.

The sleeve 24 is flanged as at 30 and on the face thereof is a series of radial grooves 31, best shown in Figs. 3 and 4. At least three of such grooves should be provided and in the form shown herein there are eight of them. These grooves may be of semi-cyclindrical shape as shown or rectangular or any other desired shape that will accomplish the purpose.

The hub of the impeller 12 is formed in its face adjacent the flange 30 with similar or complementary grooves 32, and in the cylindrical or other shaped pockets formed by the grooves 31, 32, a series of pins 33 are placed to bridge the space between the hub and sleeve. Surrounding the pins 33 is a solid ring 34 retaining the pins against radial movement in the pockets. Thus it will be seen that the pin and pocket construction of the flange 30 and the hub of the impeller 12 form a definite drive connection between the shaft and the impeller, and any expansion of the impeller by reason of its high rotational speed will cause an all-around radial expansion and the impeller will always be maintained in a central location on the shaft.

The impeller is retained against endwise movement on the shaft by a nut 35 shown as threaded on the shaft and when this nut is tightened the impeller is pressed toward the sleeve 24, the latter clamps the bearings 17 against the shoulder 26 and all of the parts are retained in position against turning or against endwise movement on the shaft.

At the opposite end of the shaft 11 the turbine wheel 13 is shown as rigidly connected to the shaft as by welding at 40.

A radial oil groove 50 connects with a circumferential groove 51 surrounding the cup 18 and there are a series of ports 52 in the cup and ports 53 in the ring 21 whereby oil may enter the space between the bearings 17 and thereby supply the bearings with lubricant. The ring 21 is of less diameter than the outer races of bearings 17 and consequently oil may flow to the clearance space between those outer races and the cup 18 thereby keeping that clearance space constantly filled. Thus the bearings 17 may be said to float in the cup 18 and except for the friction caused by the clamping of the cover 19, above referred to, and the resistance of the oil in the clearance space, the bearings 17 will be free to move radially.

The oil groove or passage 50 may be fed by any suitable means such as oil pump 60, and overflow of oil from the bearings may be through the opening 61 at one side and the passages 62, 63 and 64 at the other side.

From the above it will be seen that as the shaft is speeded up and reaches the critical speed of 8,000 or 10,000 R. P. M., should the shaft at its intermediate point where it is supported by the intermediate bearing tend to move or vibrate radially, this movement will be resisted by the friction of the outer races of the bearings 17 and by the oil surrounding those races and between them and the cup 18, and this will tend to prevent the movement or dampen or cushion it so that there will be no harmful effects.

It will be understood that various forms of the invention other than that described above may be used without departing from the spirit or scope of the invention.

What is claimed is:

1. In a gas turbine, the combination with the turbine wheel thereof, of a casing having a bearing supporting part, a shaft for said turbine wheel, a thrust bearing on said shaft, means forming a clearance space between the periphery of said bearing and said bearing supporting part, damping means in said clearance space, a sleeve splined to said shaft and retaining the bearing thereon, an impeller on said shaft, said impeller and said sleeve having complementary radial grooves formed in adjacent parts thereof, pins in said grooves and locking means on the shaft clamping the impeller to said sleeve through said pins.

2. In a machine, the combination of a casing having a bearing supporting part, a shaft mounted in the casing and having a shoulder, a thrust bearing on the shaft having its inner race against said shoulder and its outer race in said bearing supporting part with radial clearance therebetween, damping means in said clearance, a flanged sleeve splined to said shaft and bearing against said inner race, a wheel hub on said shaft, the face of said hub being arranged opposite a face of the flange of said sleeve, said flange and hub having a series of complementary radial grooves formed in their adjacent faces, pins in said grooves, and locking means on the shaft clamping the hub through said pins to said sleeve and said inner race through said sleeve to said shoulder.

3. A mounting for an impeller on a shaft comprising a shaft having a shoulder, a flanged sleeve splined to said shaft against said shoulder, an impeller having a hub on said shaft, the face of said hub being arranged opposite a face of the flange of said sleeve, said flange and face having a series of complementary radial grooves formed therein, pins in said grooves bridging the space between said sleeves and said impeller to thereby cause the impeller to rotate with the shaft, a ring for retaining the pins against radial movement, and a locking means on the shaft clamping the impeller hub to the sleeve through said pins.

4. In a gas turbine, the combination with the turbine wheel thereof, of a shaft having for said turbine wheel a shoulder, a sleeve splined to said shaft, an impeller having a hub mounted on said shaft adjacent said sleeve, said sleeve and hub having complementary radial grooves formed in adjacent surfaces, pins in said grooves, means retaining the pins against radial movement, and locking means on the shaft clamping the impeller to the sleeve through said pins.

5. In a high speed shaft mounting, the combination of a support, two widely separated bearings in said support, a shaft mounted in said bearings and free to move axially therein, an intermediate bearing for said shaft in said support, said intermediate bearing have its parts so connected to the shaft and said support that bodily axial movement of the shaft in either direction in said support is prevented, said intermediate bearing parts having radial clearance in said support, and liquid means in said clearance tending to damp radial movement of said shaft.

6. In a high speed shaft mounting, the combination of a support, two widely separated bearings in said support, a shaft mounted in said bearings and free to move axially therein, an intermediate bearing for said shaft in said support, said intermediate bearing having its parts so connected to the shaft and said support that bodily axial movement of the shaft in either direction in said support is prevented, said intermediate bearing parts having radial clearance in said support, and liquid means in said clearance and friction means combined therewith tending to damp radial movement of said shaft.

ROBERT M. WILLIAMS.

REFERENCES CITED

The following references are of record in the file of this patent:

UNITED STATES PATENTS

| Number | Name | Date |
|---|---|---|
| 656,310 | Warburton | Aug. 21, 1900 |
| 1,812,973 | Miller | July 7, 1931 |
| 2,012,997 | Junkers | Sept. 3, 1935 |
| 2,403,878 | Schmidt | July 9, 1946 |